United States Patent [19]

Dressel

[11] Patent Number: 4,780,273

[45] Date of Patent: Oct. 25, 1988

[54] NUCLEAR REACTOR FUEL ASSEMBLY

[75] Inventor: Heinrich Dressel, Hessdorf, Fed. Rep. of Germany

[73] Assignee: Kraftwerk Union Aktiengesellschaft, Mülheim, Fed. Rep. of Germany

[21] Appl. No.: 827,289

[22] Filed: Feb. 6, 1986

[30] Foreign Application Priority Data

Feb. 11, 1985 [DE] Fed. Rep. of Germany ....... 3504640

[51] Int. Cl.$^4$ .............................................. C21C 3/30
[52] U.S. Cl. ................................. 376/441; 376/438; 376/442; 376/462
[58] Field of Search ................ 376/462, 441, 442, 438

[56] References Cited

U.S. PATENT DOCUMENTS

| 3,405,033 | 10/1968 | Widell et al. | |
|---|---|---|---|
| 3,457,140 | 7/1969 | Glandin | |
| 3,753,855 | 8/1973 | Donck | 376/441 |
| 3,772,148 | 11/1973 | Seddon | 376/441 |
| 4,190,494 | 2/1980 | Olsson et al. | |

FOREIGN PATENT DOCUMENTS

| 86991 | 7/1978 | Japan | 376/441 |
|---|---|---|---|
| 1116811 | 6/1968 | United Kingdom | 376/442 |
| 1350665 | 4/1974 | United Kingdom | 376/442 |

Primary Examiner—John F. Terapane
Assistant Examiner—John S. Maples
Attorney, Agent, or Firm—Herbert L. Lerner; Laurence A. Greenberg

[57] ABSTRACT

A nuclear reactor fuel assembly for accommodating mutually parallel rods disposed side by side therein includes a spacer formed of two mutually parallel grid sections, each of the grid sections including outer straps flatly facing the rods, each of the grid sections including main sleeves being positioned like positions of the same color in rows and columns disposed at right angles on a chess board leaving a free intermediate position between each two occupied positions, the main sleeves dividing the grid sections into grid mesh openings at the positions each able to receive a respective rod therein, each main sleeve in one of the grid sections being aligned with a main sleeve in the other grid section forming pairs of main sleeves, connecting straps each interconnecting the main sleeves of a pair of main sleeves forming contact springs for rods, each of the connecting straps having a width being smaller than the circumference of one of the main sleeves, and spacer sleeves each being disposed between and resting against two of the main sleeves in one of the grid sections.

9 Claims, 3 Drawing Sheets

NUCLEAR REACTOR FUEL ASSEMBLY

The invention relates to a nuclear reactor fuel assembly with mutually parallel rods disposed side by side therein, especially nuclear reactor fuel rods, and a spacer having grid mesh openings for receiving a rod in each, the openings being positioned closely together like positions on a chess board in rows and columns disposed at right angles to each other, the spacer being formed of two mutually parallel grid sections attached together at outer straps of the spacer flatly facing the rods, the grid sections having pairs of mutually aligned main sleeves defining the grid mesh openings, each of the two main sleeves belonging to a different grid section having a connecting strap between the two main sleeves, the width of the connecting strap being smaller than the circumference of the main sleeve forming a contact spring for a rod.

Such a nuclear reactor fuel assembly is known from U.S. Pat. No. 3,457,140. In this conventional nuclear reactor fuel assembly, all of the positions of the grid mesh openings are occupied by a pair of mutually aligned main sleeves, each of which denotes a grid mesh opening. The cross sections of the main sleeves are identical with each other and have a regular octogon as the outer contour. In each grid section, the main sleeves rest on four respective sides of the regular octogon, which have an angular position of 90° relative to each other, flush against the corresponding points of the main sleeves in the adjacent grid mesh opening positions or on the inside of an outer strap of the spacer. One of four connecting straps is formed on each of the four sides and projects into the interior of the respective pair of mutually aligned main sleeves and therefore into the grid mesh opening represented thereby where they act as contact springs for the rod located in the interior space.

The spacer of the prior art nuclear reactor fuel assembly not only forms a considerable flow resistance to a coolant which flows lengthwise through the nuclear reactor fuel assembly in a nuclear reactor, but a large number of double walls are also present in the spacer, at which expensive fuel is consumed and at which many fission neutrons are absorbed in a nuclear reactor.

It is accordingly an object of the invention to provide a nuclear reactor fuel assembly, which overcomes the hereinafore-mentioned disadvantages of the heretofore-known devices of this general type, which reduces the flow resistance of the spacer and which decreases the number of double walls as far as possible.

With the foregoing and other objects in view there is provided, in accordance with the invention, a nuclear reactor fuel assembly for accommodating mutually parallel rods, especially nuclear fuel rods, disposed side by side therein, comprising a spacer formed of two mutually parallel grid sections, each of the grid sections including outer straps flatly facing the rods at which the grid sections are interconnected, each of the grid sections including main sleeves being positioned like closely spaced positions of the same color in rows and columns disposed at right angles to each other on a chess board leaving a free intermediate position between each two occupied positions, the main sleeves dividing the grid sections into grid mesh openings at the positions each able to receive a respective rod therein, each main sleeve in one of the grid sections being aligned with a main sleeve in the other grid section forming pairs of main sleeves, connecting straps each interconnecting the main sleeves of a pair of main sleeves forming contact springs for rods, each of the connecting straps having a width being smaller than the circumference of one of the main sleeves, and spacer sleeves each being disposed between and resting against two of the main sleeves in one of the grid sections.

In this manner, the grid mesh openings of the spacer are concurrently formed by the adjacent pairs of mutually aligned main sleeves and the spacer sleeves at the intermediate positions for grid mesh openings that are not occupied by the pairs of mutually aligned main sleeves, which has the effect of reducing the flow resistance of the spacer.

In accordance with another feature of the invention, each of the grid sections includes brackets in a row or column occupying mesh opening positions and leaving a free intermediate position between each two occupied positions, each bracket in one grid section being aligned with a bracket in the other grid section forming pairs of brackets, each bracket having a U-shaped cross section defining two legs extending inward from one of the outer straps at right angles, additional connecting straps interconnecting the brackets of a pair of brackets, each additional connecting strap having a width being smaller than the circumference of one of the brackets forming contact springs for rods, and additional spacer sleeves each disposed between two respective main sleeves and one respective bracket and resting against the one bracket in each of the grid sections.

In accordance with a further feature of the invention, the outer straps abut at a corner of the spacer, and each of the grid sections includes an angular part at the corner, each angular part in each grid section being aligned with an angular part in the other grid section forming pairs of angular parts, each angular part having an L-shaped cross section defining two legs extending inward from a different one of the outer straps at right angles, additional connecting straps interconnecting the angular parts of a pair of angular parts, each additional connecting strap having a width being smaller than the circumference of one of the angular parts forming contact springs for rods, and additional spacer sleeves each disposed between a respective main sleeve and a respective angular part and resting against the angular part.

In accordance with an added feature of the invention, the spacer sleeves have a smaller cross section than the main sleeves.

In accordance with an additional feature of the invention, the cross section of the spacer sleeves has a rectangular outer contour.

In accordance with again another feature of the invention, the spacer has a square cross section and the outer straps are straight and elongated.

In accordance with again a further feature of the invention, the cross section of the main sleeves has an at least substantially regular octogonal outer contour.

In accordance with again an added feature of the invention, the cross section of the spacer sleeves has a square contour with sides at least substantially equal in length to the length of a side of the octogonal contour of the main sleeves.

In accordance with again an additional feature of the invention, each spacer sleeve in one of the grid sections is aligned with a spacer sleeve in the other grid section forming pairs of spacer sleeves.

In accordance with yet another feature of the invention, the spacer sleeve pairs include connecting straps having widths being smaller than the circumference of a spacer sleeve.

In accordance with yet a further feature of the invention, the spacer sleeves have longitudinal slots formed therein.

In accordance with a concomitant feature of the invention, the main sleeves have longitudinal slots formed therein.

These embodiments of the nuclear reactor fuel assembly partially provide a production-friendly structure of the spacer and in particular partially reduce neutron absorption and still further reduce the flow resistance of the spacer.

Other features which are considered as characteristic for the invention are set forth in the appended claims.

Although the invention is illustrated and described herein as embodied in a nuclear reactor fuel assembly, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in cinnection with the accompanying drawings, in which.

Figure 2:
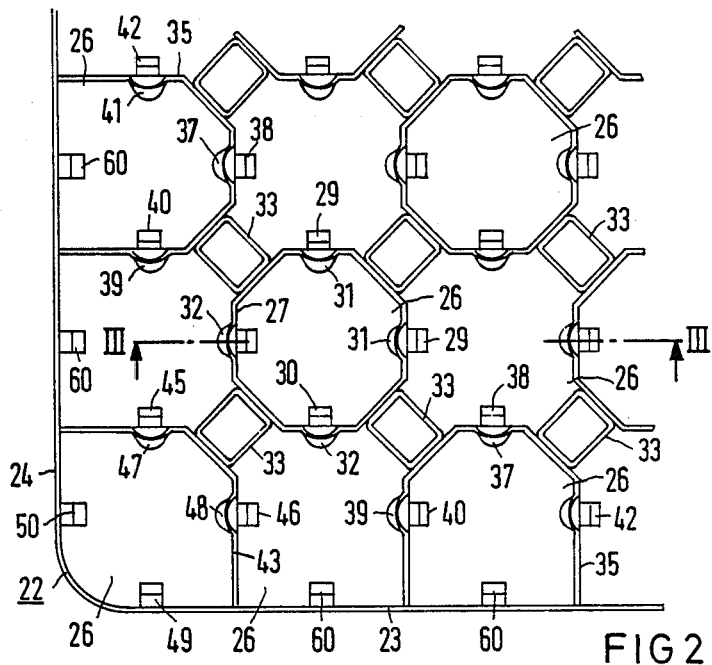
FIG. 2 is a fragmentary, top-plan view of a portion of a spacer in a nuclear reactor fuel assembly according to FIG. 1.
Figure 5:
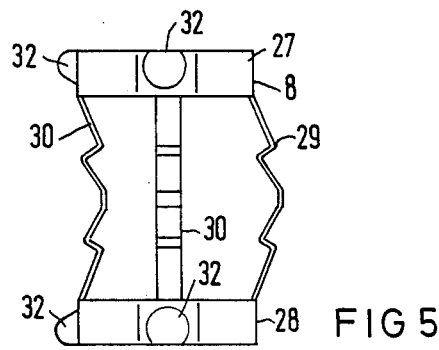
Figure 4:
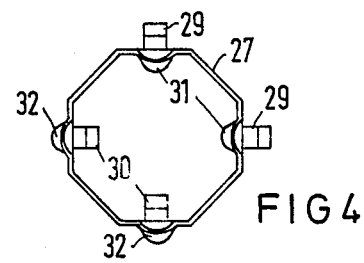
Figure 3:
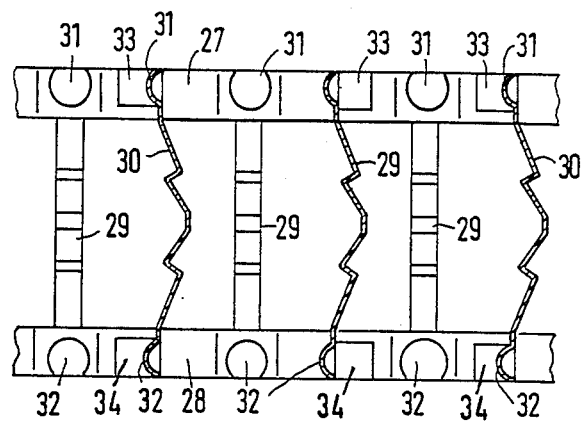

FIG. 3 is a fragmentary, longitudinal-sectional view taken along the line III—III in FIG. 2, in the direction of the arrows; and FIGS. 4 and 5; 6 and 7; 8 and 9 are respective top-plan and side-elevational views of individual parts of the spacer according to FIGS. 2 and 3.

Figure 1:
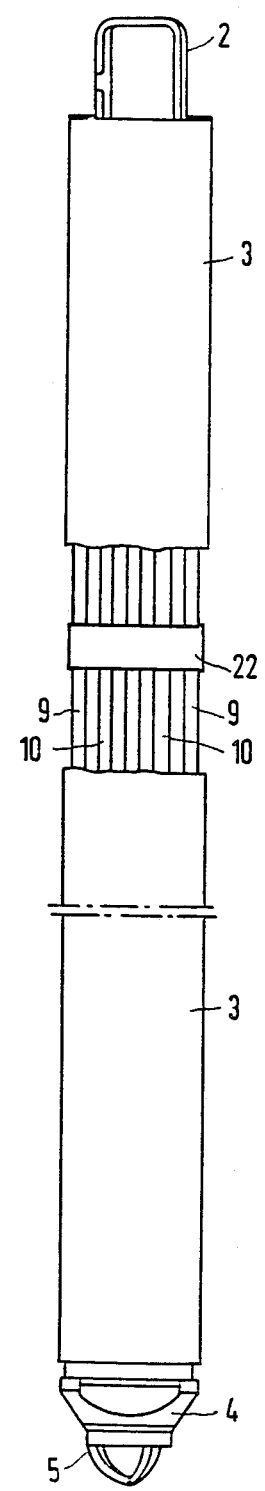
FIG. 1 is a fragmentary, diagrammatic, elevational view of a nuclear reactor fuel assembly according to the invention.

Referring now to the figures of the drawings and first, particularly, to FIG. 1 thereof, there is seen a nuclear reactor fuel assembly which is intended for a boiling-water nuclear reactor. The fuel assembly has a fuel assembly head which does not have distinguishable details, but which has a handle 2 on the top or upper surface of a square grid plate. The top or upper surface of this square grid plate also has two non-illustrated stay rods on which rests a sheet metal enclosure box 3 associated with the nuclear reactor fuel assembly with two non-illustrated transverse sheet metal strips which are attached at two corners inside the enclosure box 3 at the upper end of the box. One of these transverse strips is bolted to a respective stay rod. The enclosure box 3 has a square cross section and is open at both ends. The grid plate itself is provided with a multiplicity of flow passages running in the lengthwise direction of the nuclear reactor fuel assembly, through which $H_2O$ flows in the reactor core of the boiling-water nuclear reactor. The grid plate is disposed at right angles to the longitudinal direction of the nuclear reactor fuel assembly.

The nuclear reactor fuel assembly according to FIG. 1 is furthermore provided with a fuel assembly base 4 which also has a nonillustrated square grid plate. This square grid plate also has a multiplicity of flow passages running in the longitudinal direction of the nuclear reactor fuel assembly for $H_2O$ in the reactor core of the boiling-water nuclear reactor. The underside of the grid plate of the fuel assembly base 4 is provided with an adapter 5 which is open toward the grid plate and which is inserted into a mesh of a so-called lower core grid located in the reactor core of the boiling-water nuclear reactor.

The nuclear reactor fuel assembly according to FIG. 1 additionally has a number of fuel rods which are constructed as holding rods 9 for the head part and the base part 4 of the nuclear reactor fuel assembly and are filled with nuclear fuel. These holding rods 9 are screwed into the grid plate of the fuel assembly base 4 and pass through the grid plate of the fuel assembly head and are screwed to the grid plate of the fuel assembly head by a nut located at the top or upper surface of the grid plate. Other fuel rods 10 filled with nuclear fuel have ends which are inserted loosely into feedthroughs in the grid plates of the head part and the base part 4 of the nuclear reactor fuel assembly. Hold-down coil springs in the form of compression springs are mounted on the upper ends of the fuel rods 10 and are braced against the fuel rods 10 on one hand and against the lower surface of the grid plate of the fuel assembly head on the other hand.

Finally, the nuclear reactor fuel assembly according to FIG. 1 has several rectangular spacers 22 which in this case are square and are disposed between the fuel assembly head and the fuel assembly base 4. The spacers 22, one of which can be seen in FIG. 1, are aligned with the square grid plates of the head part and the base part 4. The other spacers are identical to the spacer 22, but they are covered by the enclosure box 3 associated with the fuel assembly, just like the grid plate of the head part and the grid plate of the base part 4 and are therefore not visible in the drawing.

A spacer 22 shown in detail in FIGS. 2 and 3 has a square shape and is formed of a nickel-chromium-iron alloy. Two flat, planar, outer straps 23 and 24 stand on end at right angles and form a rounded portion at the corners of the spacer 22. The spacer 22 also has grid meshes or mesh openings 26 which are located close together in rows and in columns at right angles to the rows like the squares of a chess board. Respective fuel rods of the nuclear reactor fuel assembly containing nuclear fuel, which are not shown in FIGS. 2 and 3, extend through the grid mesh openings 26. The outer straps 23 and 24 are orthogonal to the fuel rods and the outer straps 23 and 24 face the fuel rods in a flat form. Such a fuel rod contains nuclear fuel in a hermetically sealed cladding tube formed of a zirconium alloy.

Within the outer straps 23 and 24 of the spacer 22 are pairs of mutually aligned main sleeves 27 and 28 which are shown in detail in FIGS. 4 and 5. The main sleeves 27, 28 have longitudinal axes that are coaxial to each other and to the fuel rods within the spacer 22 at positions of the grid mesh openings 26 in rows and in columns orthogonal to these rows, like areas of the same color on a chess board, so as to leave an intermediate free position between two occupied positions.

As is shown particularly in FIG. 4 and 5, the main sleeves 27 and 28 of every pair of main sleeves of the spacer 22 have a cross section with congruent outside contours, which are regular octagons. Each two sides of the octagonal main sleeves 27, 28 which are parallel to a particular outer strap 23 or 24, are provided with connecting straps 29 and 30 which extend in a direction parallel to the longitudinal axes of the pairs of main sleeves 27 and 28. The connecting straps 29 and 30 are always formed in the center of a side of the regular octagon forming the outer contour of the cross section of the main sleeves 27 and 28 and have a width which is about ⅓ of the length of the side of the regular octagon. Each two connecting straps 29 and 30 located at mutually parallel sides of the octagon are bent in the center in the same direction, i.e., a connecting strap 29 is bent outward relative to the main sleeves 27 and 28 and a connecting strap 30 is bent inward relative to the main sleeves 27 and 28. The main sleeves 27 and 28 also have a rigid knub 32 in the center of the sides of the outer contour of the regular octagonal cross section thereof. The rigid knub 31 on the side of the outer contour points inward at locations where the connecting strap 29 points outward relative to the main sleeve 27 or 28, and the rigid knub 32 points outward relative to the main sleeve 27 or 28 at locations where the connecting strap 30 points inward relative to these main sleeves 27 and 28.

In the spacer 22, pairs of mutually aligned spacer sleeves 33 and 34 are diagonally disposed between the main sleeves 27 and 28. The spacer sleeves 33, 34 have a cross section which is smaller than the cross section of the main sleeves 27 and 28 and a rectangular outer contour. The outer contour may also be a square, the length of the side of which is equal to the length of the side of the cross section of the main sleeves 27 and 28 forming a regular octagon. These spacer sleeves 33 and 34 are located between the main sleeves 27 and 28, resting flush against one of the sides of the outer contour of the cross section of the mainsleeves which are located between two other sides with connecting straps 29 and 30 and knubs 31 and 32, respectively. The main sleeves 27 together with the spacer sleeves 33 welded thereto, form a first grid section of the spacer 22 and the main sleeves 28 together with the spacer sleeves 34 welded thereto form a second grid section parallel to the first grid section.

Figure 7:
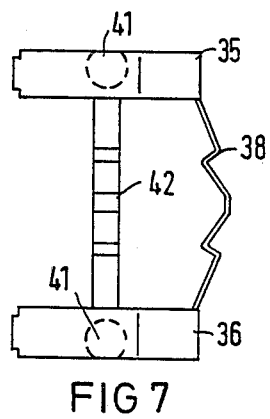
Figure 6:
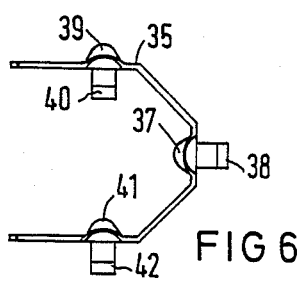

According to FIGS. 6 and 7, a pair of mutually aligned brackets 35 and 36 formed of U-shaped straps facing the non-illustrated rods in a flat form, are disposed at respective outer straps 23 or 24 at given positions in the grid mesh openings 26 of a row or column. The two legs of the brackets 35 and 36 are disposed at right angles to the inside of a respective outer strap 23 or 24. The brackets have tabs which pass through the outer straps and are welded to the outer straps 23 or 24. The brackets 35 and 36 have a cross section between their two legs with an outer contour in the shape of one-half of a regular octagon, which is congruent with the regular octagon forming the outer contour of the cross section of the main sleeves 27 and 28. In every grid section of the spacer 22 there is a spacer sleeve 33, 34 disposed in the diagonal direction between two main sleeves 27 and 28 and a bracket 35, 36, respectively, resting flush against the spacer sleeve, with a cross section having a rectangular outer contour. The outer contour may also be a square with a side having a length which is equal to the length of the side of the regular octagon forming the outer contour of the cross section of the main sleeves 27 and 28. The spacer sleeves 33 and 34 which are aligned with each other are welded to the brackets 35 and 36. Between the mounting surfaces of the spacer sleeves 33 and 34, the brackets 35 and 36 are disposed parallel to the outer strap 23, 24, to which they are welded. At that location, each of the brackets have a central rigid knub 37 which points inward with respect to the brackets 35 and 36, respectively. In addition, a connecting strap 38 is formed between the two brackets 35 and 36, the width of which is approximately equal to ⅓ of the length of a side of the regular octagon forming the outer contour of the cross section of the main sleeves 27 and 28. The strap 38 is bent outward relative to the brackets 35 and 36 and forms a contact spring for a non-illustrated rod in a grid mesh opening 26. In addition, one leg of the brackets 35 and 36 has a knub 39 pointing outward with respect to the respective brackets 35 and 36. A connecting strap 40 is also formed at the same point with the same width as the connecting strap 38. The strap 40 is bent inward relative to the two brackets 35 and 36 and forms a contact spring for a non-illustrated rod in a grid mesh opening 26. At the other leg of the brackets 35 and 36, a rigid knub 41 pointing inward relative to these brackets 35 and 36 is disposed. A connecting strap 42 with the same width as the connecting strap 38 is formed at the same point between the straps 35 and 36. The strap 42 is bent outward with respect to the two brackets 35 and 36 and likewise forms a contact spring for a non-illustrated rod in a grid mesh opening 26.

Figure 9:
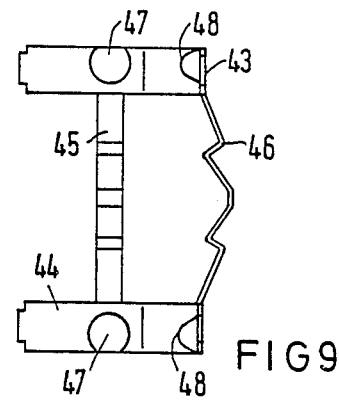
Figure 8:
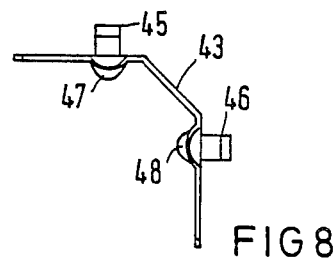

According to FIGS. 8 and 9, a pair of mutually aligned angular parts 43 and 44 with an L-shaped cross section are formed of straps flatly facing the rods. The parts 43 and 44 are disposed between two outer straps 23 and 24 abutting each other at right angles at a corner of the spacer 22 in a corner position of the grid mesh opening 26. The legs of each of the angular parts 43 and 44 are disposed at right angles on the inside of another one of the two outer straps 23 and 24. The parts 43, 44 have a tab which passes through and with which they are welded to, the respective outer strap.

Between the two legs thereof, the angular parts 43 and 44 have a cross section with an outer contour which is equal to one-quarter of the regular octagon which is the outer contour of the cross section of the main sleeves 27 and 28. A spacer sleeve 33 and 34 with a cross section having a rectangular outer contour is disposed in each of the two mutually parallel grid sections of the spacer 22, between a main sleeve 27 or 28 and an angular part 43 or 44. The outer contour may also be a square with a side having a length equal to the length of the side of the regular octagon forming the outer contour of the cross section of the main sleeves 27 and 28. These spacer sleeves 33 and 34 which are aligned with each other, rest flush against the angular parts 43 and 44 and the respective main sleeves 27 and 28, to which they are welded. The straps of the angular parts 43 and 44 face the non-illustrated rods in the spacer 22 in a flat form.

A connecting strap 45 and 46 is formed on each of the legs of the angular parts 43 and 44 on both sides of the junction with the spacer sleeves 33 and 34. The width of the two connecting straps 45 and 46 is approximately equal to ⅓ of the length of the side of the regular octagon representing the outer contour of the cross section of the main sleeves 27 and 28. Both connecting straps 45 and 46 are bent outward relative to the angular parts 43 and 44 and form contact springs for a non-illustrated rod in a grid mesh opening 26. The legs of the anular parts 43 and 44 have a respective rigid knub 47 and 48 which points inward with respect to the angular parts 43 and 44, at the points where the connecting straps 45 and 46 are formed. Straps 49 and 50 are provided opposite the two rigid knubs 47 and 48 on the inside of the outer straps 23 and 24 and are bent inward relative to the outer straps 23 and 24 forming contact springs for a non-illustrated rod in the grid mesh opening 26 in the respective corner of the spacer 22. Similarly, straps 60 are bent inward relative to the outer straps 23 and 24 opposite the rigid knubs 32 and 37 at the main sleeves 27 and 28 or at the brackets 35 and 36, forming control springs which extend over a direction parallel to the longitudinal axes of the pairs of main sleeves 27 and 28.

Due to the fact that the grid mesh openings 26 of the spacer 22 are formed either by the interior of the main sleeves 27 and 28 or by the brackets 35 and 36 formed of U-shaped straps or by the angular parts 43 and 44 formed of L-shaped straps or by the space between the spacer sleeves 33 and 34 and main sleeves 27 and 28 or by brackets 35 and 36 with U-shaped straps or angular parts 43 and 44 with L-shaped straps, a non-illustrated rod always has two elastic three-point supports which only offer little flow resistance to a coolant flowing in the longitudinal direction of the nuclear reactor fuel assembly. Each three point support is formed of two knubs 31 and one connecting strap 30.

The spacer sleeves 33 and 34 which are aligned in pairs, can also have non-illustrated connecting straps on the sides of their outer contour, for instance, the width of which is smaller than the circumference of the spacer sleeves. The spacer sleeves 33 and 34 may also have a longitudinal slot for reducing the amount of material required for the sleeves. The main sleeves 27 and 28 can also be provided with a longitudinal slot.

The nuclear reactor fuel assembly according to the invention, especially with a spacer according to FIGS. 2 to 9, can also be a nuclear reactor fuel assembly for a pressurized-water nuclear reactor. In such a nuclear reactor fuel assembly, besides fuel rods containing nuclear fuel, control rod guide tubes which are detachably fastened with one end to a head plate of a head part and with the other end to a base plate of a base part of the nuclear reactor fuel assembly, such as by a screw connection, also extend through the grid mesh openings 26 of the spacer 22. The control rod guide tubes pass through the head and base plate at right angles. The head and base plates may also be square. The fuel rods extending through one of the mesh openings 26 of the spacer 22 are fastened neither to the head plate nor to the base plate of the nuclear reactor fuel assembly, but instead they have play between the head and the base plates in the longitudinal direction and therefore can expand freely in the direction of their longitudinal axis, i.e., in the longitudinal direction of the nuclear reactor fuel assembly.

The foregoing is a description corresponding in substance to German Application No. P 35 04 640.6, filed Feb. 11, 1985, the International priority of which is being claimed for the instant application, and which is hereby made part of this application. Any material discrepancies between the foregoing specification and the aorementioned corresponding German application are to be resolved in favor of the latter

I claim:

1. Nuclear reactor fuel assembly for accommodating mutually parallel rods parallel rods disposed side by side therein, comprising a spacer formed of two mutually parallel grid sections, each of said grid sections including outer straps flatly facing the rods, each of said grid sections being formed of discrete, spaced-apart main sleeves being positioned like positions of the same color in rows and columns disposed at right angles to each other on a chess board leaving an intermediate position free of said main sleeves between each two occupied positions, said main sleeves dividing said grid sections into grid mesh openings at said positions each able to receive a respective rod therein, each main sleeve in one of said grid sections being aligned with a main sleeve in the other grid sections forming pairs of main sleeves, connecting straps each interconnecting said main sleeves of a pair of main sleeves forming contact springs for rods, each of said connecting straps having a width being smaller than the circumference of one of said main sleeves, and spacer sleeves each being disposed completely outside and resting against two of said main sleeves in one of said grid sections.

2. Nuclear reactor fuel assembly according to claim 1, wherein each of said grid sections includes brackets occupying mesh opening positions and leaving an intermediate position free of said brackets between each two occupied positions, each bracket in one grid section being aligned with a bracket in the other grid section forming pairs of brackets, each bracket having a U-shaped cross section defining two legs extending inward from one of said outer straps at right angles, additional connecting straps interconnecting said brackets of a pair of brackets, each additional connecting strap having a width being smaller than the width of one of said brackets forming contact springs for rods, and additional spacer sleeves each disposed between two respective main sleeves and one respective bracket and resting against said one bracket in each of said grid sections.

3. Nuclear reactor fuel assembly according to claim 1, wherein said outer straps abut at a corner of said spacer, and each of said grid sections includes an angular part at said corner, each angular part in each grid section being aligned with an angular part in the outher grid section forming pairs of angular parts, each angular part having an L-shaped cross section defining two legs extending inward from a different one of said outer straps at right angles, additional connecting straps interconnecting said angular parts of a pair of angular parts, each additional connecting strap having a width being smaller than the width of one of said angular parts forming contact springs for rods, and additional spacer sleeves each disposed between a respective main sleeve and a respective angular part and resting against said angular part.

4. Nuclear reactor fuel assembly according to claim 1, wherein said spacer sleeves have a smaller cross section than said main sleeves.

5. Nuclear reactor fuel assembly according to claim 1, wherein the cross section of said spacer sleeves has a rectangular outer contour.

6. Nuclear reactor fuel assembly according to claim 1, wherein said spacer has a square cross section and said outer straps are straight and elongated.

7. Nuclear reactor fuel assembly according to claim 1, wherein each spacer sleeve in one of said grid sections is aligned with a spacer sleeve in the other grid section forming pairs of spacer sleeves.

8. Nuclear reactor fuel assembly according to claim 1, wherein the cross section of said main sleeves has an at least substantially regular octagonal outer contour.

9. Nuclear reactor fuel assembly according to claim 8, wherein the cross section of said spacer sleeves has a square contour with sides at least substantially equal in length to the length of a side of the octagonal contour of said main sleeves.

* * * * *